(12) United States Patent
Doerr et al.

(10) Patent No.: US 8,682,119 B2
(45) Date of Patent: Mar. 25, 2014

(54) HIGH PERFORMANCE OPTICAL POLARIZATION DIVERSITY CIRCUIT

(75) Inventors: Christopher Doerr, Middletown, NJ (US); Long Chen, Matawan, NJ (US)

(73) Assignee: Alcatel Lucent, Paris (FR)

( * ) Notice: Subject to any disclaimer, the term of this patent is extended or adjusted under 35 U.S.C. 154(b) by 128 days.

(21) Appl. No.: 13/103,332

(22) Filed: May 9, 2011

(65) Prior Publication Data
US 2012/0288229 A1   Nov. 15, 2012

(51) Int. Cl.
*G02B 6/26* (2006.01)
(52) U.S. Cl.
USPC .................. 385/29; 29/874; 385/31; 385/50
(58) Field of Classification Search
USPC ............... 385/11, 29, 37, 39, 45, 50; 29/874
See application file for complete search history.

(56) References Cited

U.S. PATENT DOCUMENTS

| | | | | |
|---|---|---|---|---|
| 4,889,401 A | * | 12/1989 | Klement et al. | 385/131 |
| 4,943,131 A | * | 7/1990 | Taki | 385/29 |
| 5,475,771 A | * | 12/1995 | Hosoi | 385/11 |
| 5,581,642 A | * | 12/1996 | Deacon et al. | 385/15 |
| 5,946,434 A | * | 8/1999 | Lee | 385/45 |
| 6,473,541 B1 | * | 10/2002 | Ho | 385/15 |
| 7,065,272 B2 | | 6/2006 | Taillaert et al. | |
| 7,130,509 B2 | * | 10/2006 | Painter et al. | 385/50 |
| 7,444,055 B2 | * | 10/2008 | Tolstikhin et al. | 385/131 |
| 7,848,602 B2 | * | 12/2010 | Kim et al. | 385/46 |
| 2004/0008916 A1 | * | 1/2004 | Ridgway et al. | 385/2 |
| 2005/0123241 A1 | * | 6/2005 | Margalit et al. | 385/39 |
| 2006/0133734 A1 | * | 6/2006 | Szafraniec et al. | 385/50 |

FOREIGN PATENT DOCUMENTS

WO    2010107439 A1    9/2010

OTHER PUBLICATIONS

Fukada, Hiroshi, et al., "Polarization Beam Splitter and Rotator for Polarization-Independent Silicon Photonic Circuit", 2007 IEEE, pp. 4-6.

Doerr, Christopher R., et al., "Monolithic PDM-DQPSK receiver in silicon", Optical Communication (ECOC), 2010 36th European Conference and Exhibition on Issue Date: Sep. 19-23, 2010, E-ISBN: 978-1-4244-8534-5, Print ISBN: 978-1-4244-8536-9, 3 pages.

* cited by examiner

*Primary Examiner* — Ellen Kim
(74) *Attorney, Agent, or Firm* — Hitt Gaines, PC

(57) ABSTRACT

An optical device includes an input/output optical coupler, a waveguide and a waveguide fragment. The optical coupler is configured to separate a received optical signal into first and second signal components. The waveguide is connected to the optical coupler and configured to propagate the first signal component via a first propagation mode. The waveguide fragment is located adjacent to the first waveguide and is configured to couple light from the first waveguide that propagates therein by a different second propagation mode.

23 Claims, 6 Drawing Sheets

HIGH PERFORMANCE OPTICAL POLARIZATION DIVERSITY CIRCUIT

TECHNICAL FIELD

This application is directed, in general, to optical devices and methods of manufacturing and using optical devices.

BACKGROUND

This section introduces aspects that may help facilitate a better understanding of the invention(s). Accordingly, the statements of this section are to be read in this light and are not to be understood as admissions about what is in the prior art or what is not in the prior art.

A coherent optical-detection scheme is capable of detecting not only the amplitude of an optical signal, but also the signal's polarization and phase. These capabilities make coherent optical detection compatible with polarization-division multiplexing (PDM) and with the use of spectrally efficient modulation formats, such as quadrature amplitude modulation (QAM) and phase-shift keying (PSK) in its various forms (e.g., differential PSK (DPSK) and differential quadrature PSK (DQPSK). Compared to incoherent detectors, coherent optical detectors offer relatively easy wavelength tunability, good rejection of interference from adjacent channels in dense wavelength-division-multiplexing (DWDM) systems, linear transformation of the electromagnetic field into an electrical signal for effective application of modern digital signal processing techniques, and an opportunity to use polarization-division multiplexing. As a result, coherent optical detectors are currently being actively developed.

SUMMARY

One aspect provides an optical device that includes an optical input/output coupler, a waveguide and a waveguide fragment. The optical coupler is configured to separate a received optical signal into first and second signal components. The waveguide is connected to the optical coupler and configured to propagate the first signal component via a first propagation mode. The waveguide fragment is located adjacent the first waveguide and is configured to couple light from the first waveguide that propagates therein by a different second propagation mode.

Another aspect provides a method. The method includes forming an input/output optical coupler, a waveguide and a waveguide fragment. The optical coupler is configured to separate a received optical signal into first and second signal components. The waveguide is connected to the optical coupler and configured to propagate the first signal component via a first propagation mode. The waveguide fragment is located adjacent to the first waveguide and is configured to couple light from the first waveguide that propagates therein by a different second propagation mode.

BRIEF DESCRIPTION

Reference is made to the following descriptions taken in conjunction with the accompanying drawings, in which.

Figure 2A:
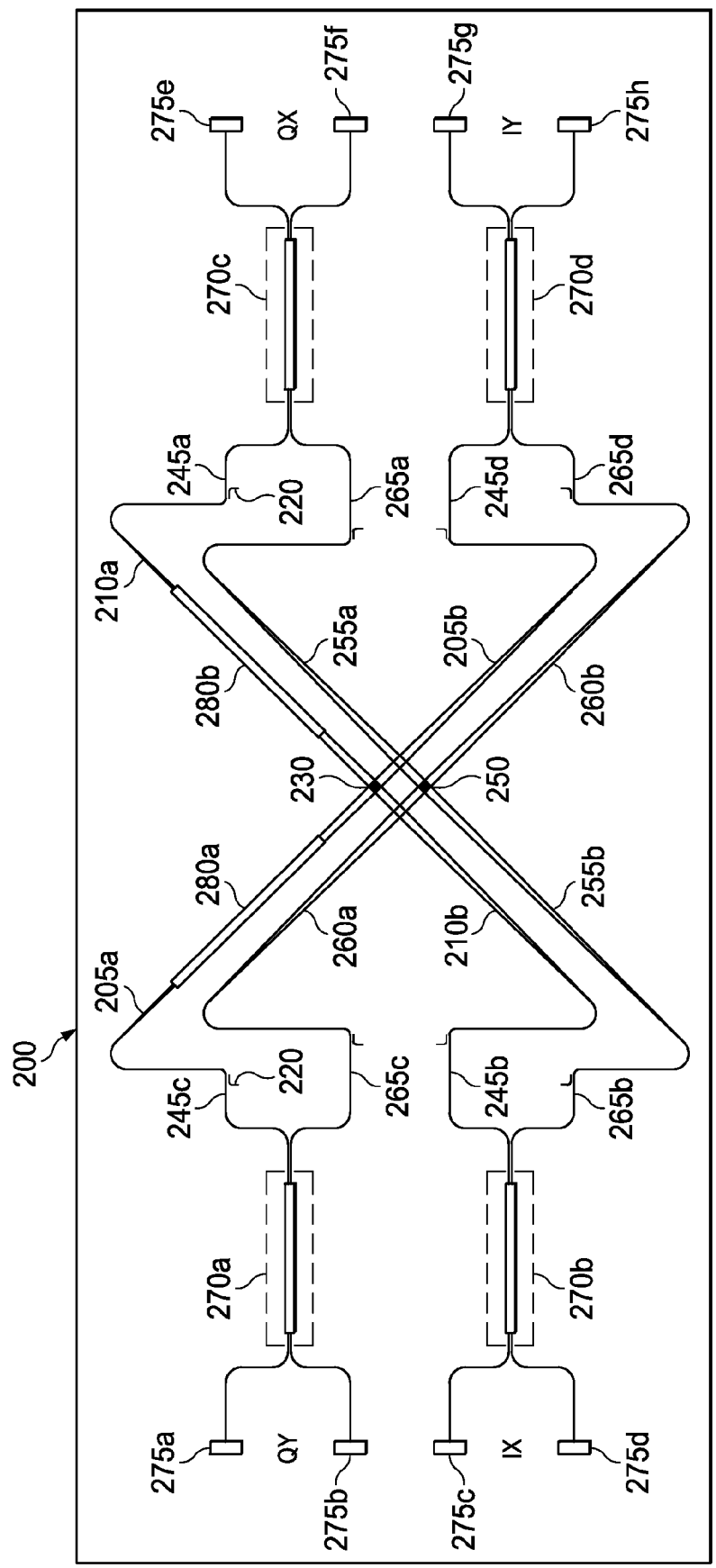
FIGS. 2A-2C illustrate a photonic integrated circuit having a receiver configured to demodulate a polarization division multiplexed quadrature phase shift keyed optical signal.
Figure 2B:
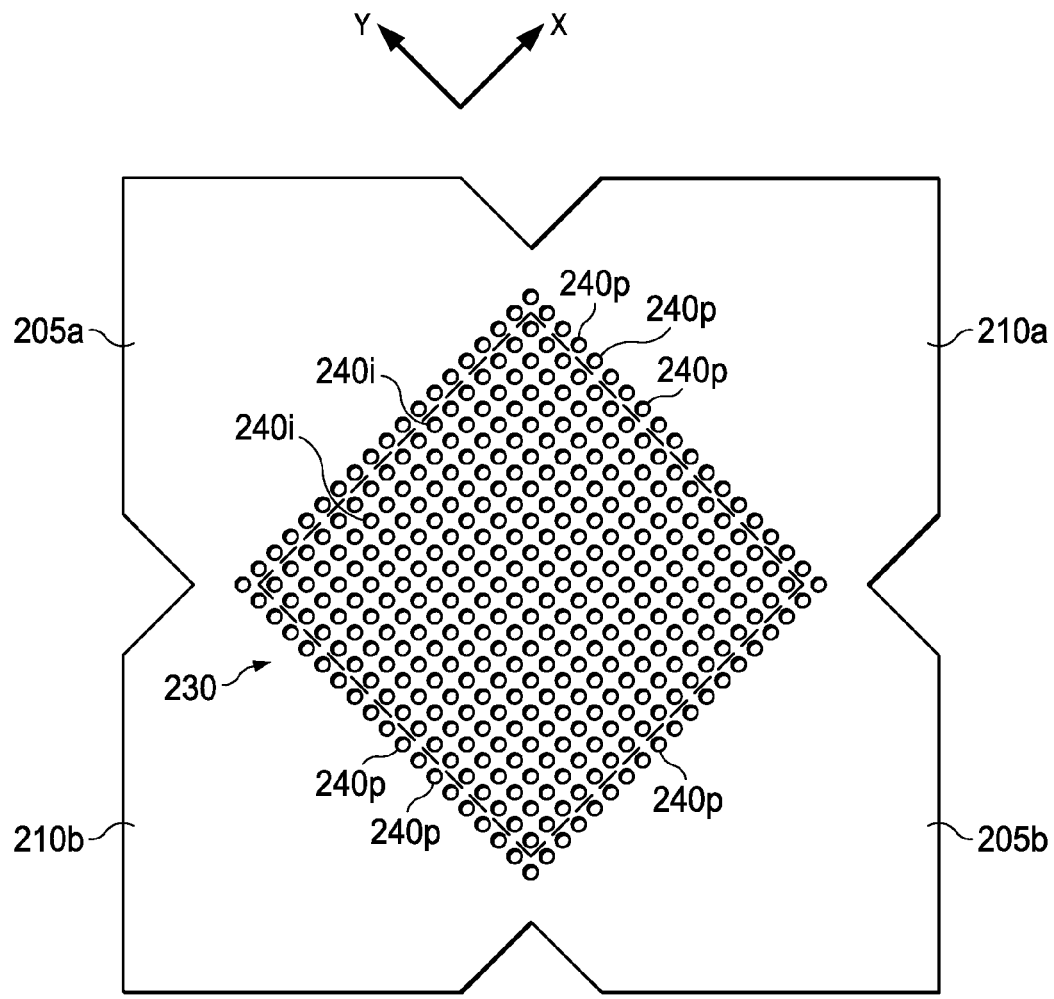
Figure 2C:
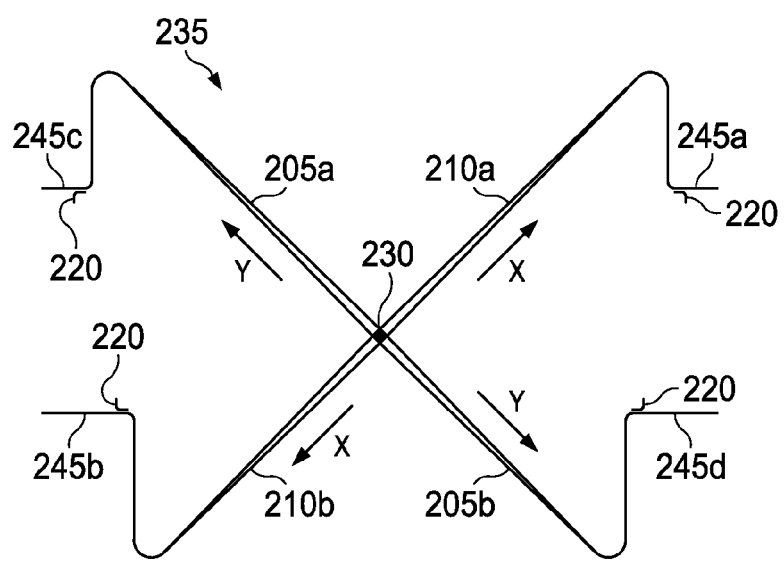
Figure 3:
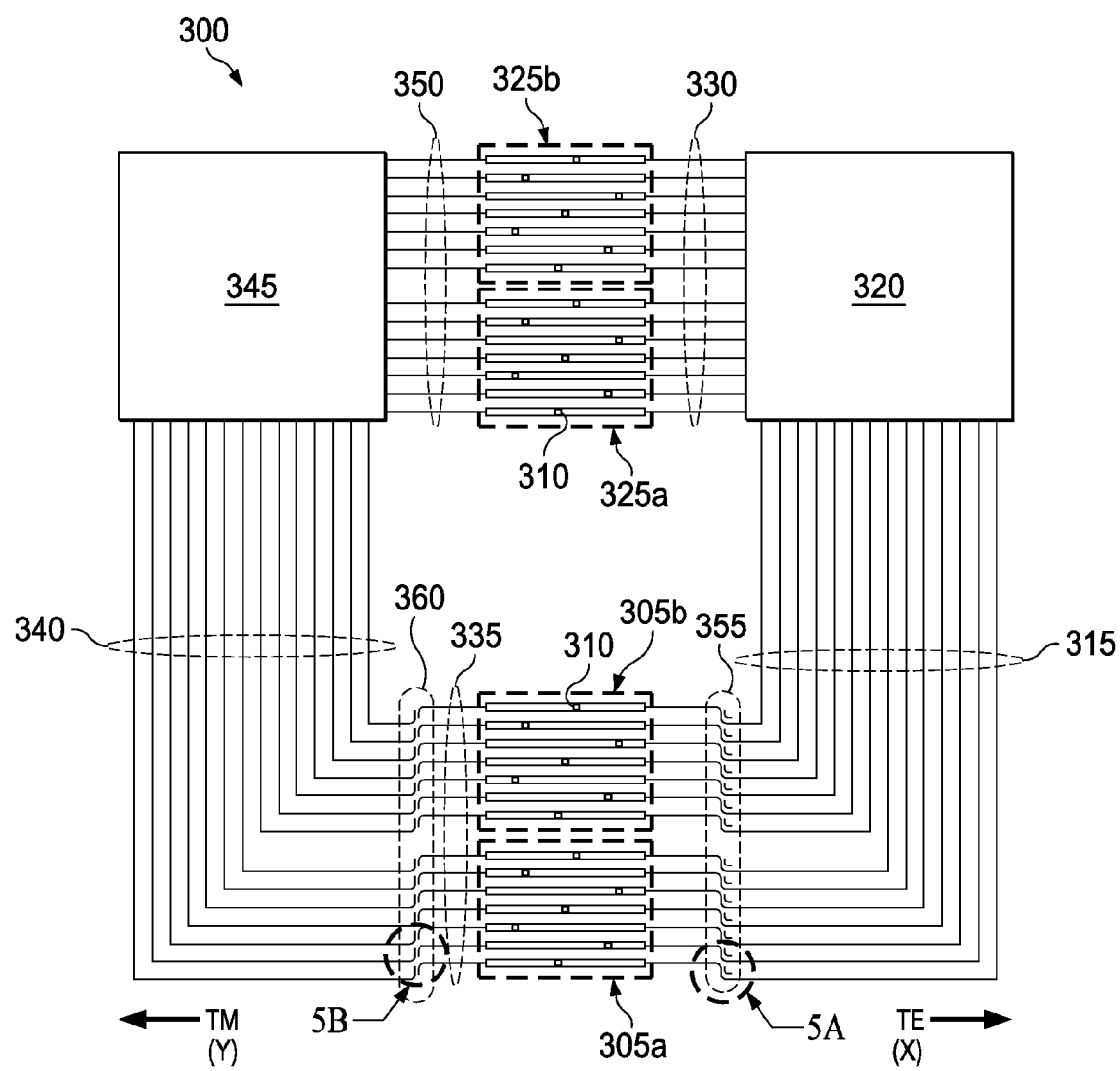
FIG. 3 illustrates a multicore fiber switching network that includes waveguide fragments placed to filter TM noise from some waveguides.
Figure 4:
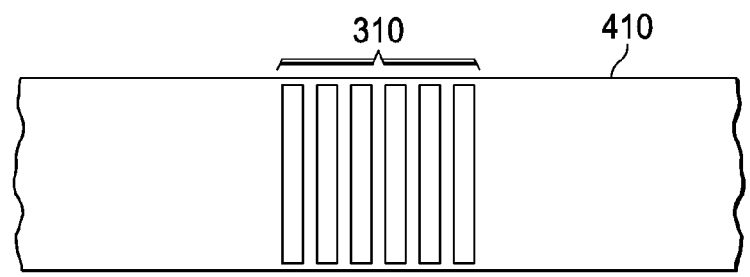
FIG. 4 illustrates a waveguide grating according to one embodiment that may be used in the multicore fiber network of FIG. 3.
Figure 5A:
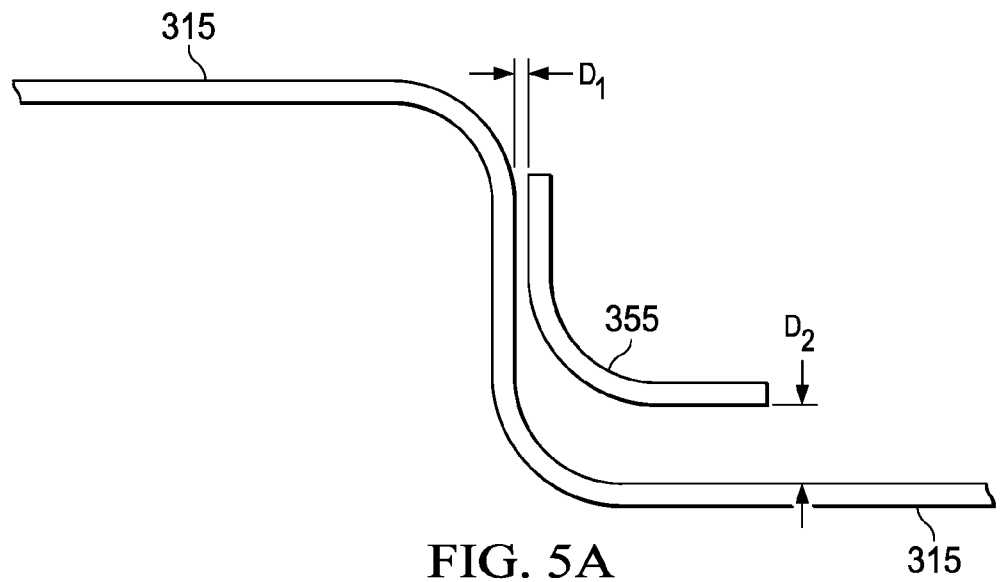
Figure 5B:
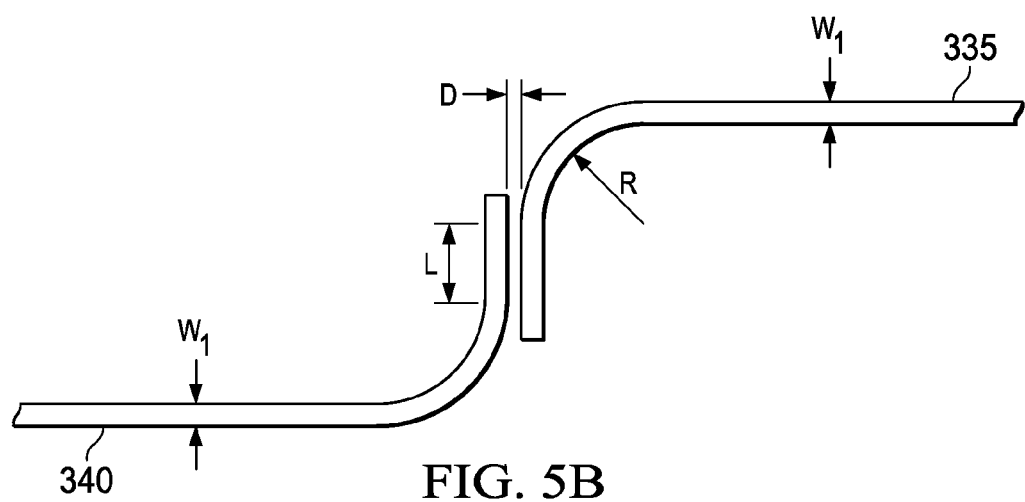
Figure 6:
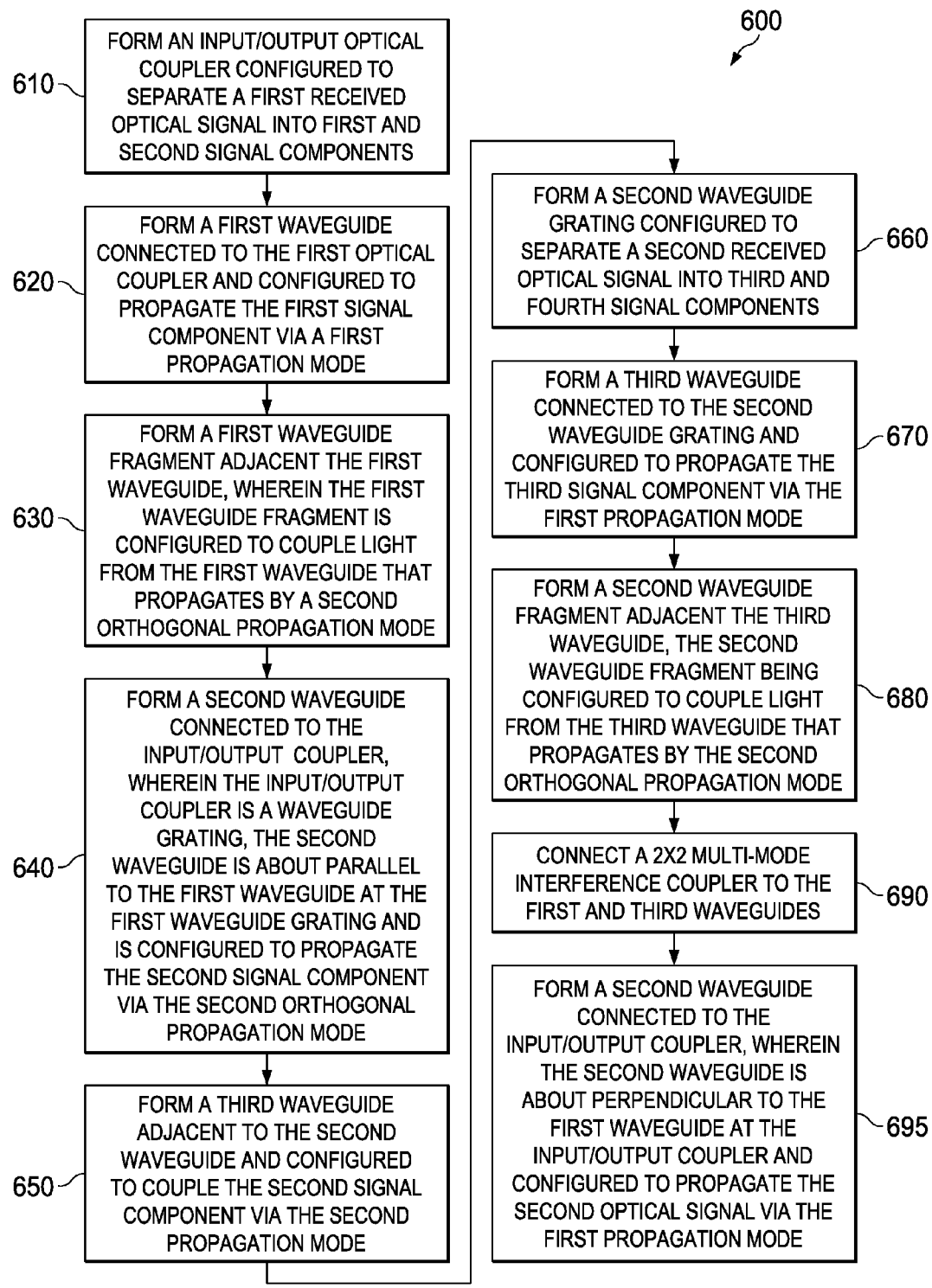

FIGS. 5A and 5B respectively illustrate aspects of a TM-mode filter and a TE-mode filter provided in the multicore fiber switching network of FIG. 3; and FIG. 6 illustrates a method according to one embodiment, e.g. of forming optical devices of the disclosure, e.g. as described by FIGS. 1-5.

DETAILED DESCRIPTION

This disclosure benefits from the recognition that unwanted polarization modes of an optical signal may be effectively coupled from a primary optical waveguide to a secondary optical waveguide fragment placed near the waveguide. The unwanted polarization mode may thereby be removed, e.g. filtered, from the primary waveguide, thereby increasing the fidelity of later processing of the optical signal. Such filtering may, e.g. reduce an input signal-to-noise ratio required by an optical receiver to achieve a desired bit error rate.

Figure 1:
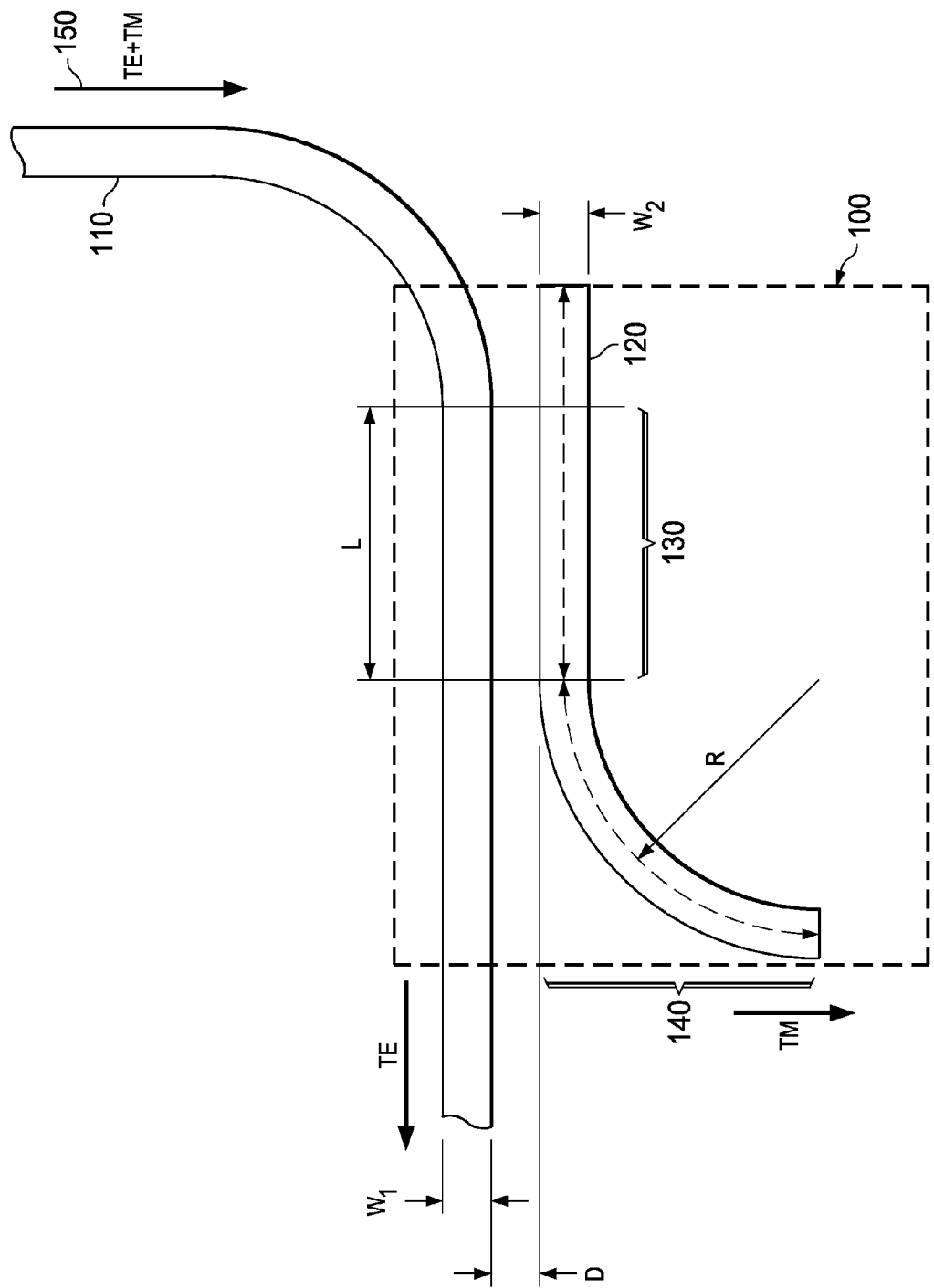
FIG. 1 illustrates waveguide fragment according to one embodiment of the disclosure, wherein the waveguide fragment is configured to filter TM noise from an optical waveguide, such as used in the receiver 200 of FIG. 2.

FIG. 1 illustrates a plan view of a propagation mode filter 100 according to one embodiment of the disclosure. The mode filter 100 includes a primary waveguide 110 and a secondary waveguide 120. The secondary waveguide 120 includes a coupled portion 130 and an optional redirecting portion 140. The coupled portion 130 runs adjacent and about parallel to the primary waveguide 110 over a length L. The redirecting portion 140, when present, substantially deviates from parallel to the primary waveguide 110.

The primary waveguide 110 is a waveguide that propagates, or is configured to propagate, an optical signal to the vicinity of the secondary waveguide 120. The secondary waveguide 120 is a waveguide configured to couple optical energy from the primary waveguide 110. The secondary waveguide 120 may be, and is illustrated as, a waveguide fragment, and may be referred to herein as such. Herein a waveguide fragment is a waveguide structure that has no direct source or destination. Having no direct source means that there is no source of optical energy to the waveguide fragment other than light coupled indirectly from another waveguide, e.g. from the primary waveguide 110, such as via an evanescent wave. Having no direct destination means that the waveguide fragment is not connected to any device that is configured to manipulate optical energy propagated by the waveguide fragment, e.g. a switch, coupler or photodiode. In an illustrative embodiment energy coupled to the secondary waveguide 120 from the primary waveguide 110 is incoherently scattered to the surrounding medium.

The primary waveguide 110 and the secondary waveguide 120 may be, e.g. planar or ridge waveguide structures. They may be formed of any suitable optical medium over any suitable substrate. For example the optical medium may be, e.g. semiconductors such as silicon or InGaAsP, or dielectrics such as $Si_3N_4$ or $SiO_2$. The discussion herein may refer to the medium as silicon without limitation. The substrate may include a semiconductor wafer, e.g. a silicon wafer, or a portion of a semiconductor wafer. An optical isolation layer, e.g. $SiO_2$, may be located between the substrate and the waveguides 110, 120. A cladding layer, e.g. SiO$_2$, may be formed over the waveguides 110, 120.

In various embodiments the primary waveguide 110 may propagate an optical signal 150 in a first and a different second propagation mode. Optionally the different propagation modes may be about orthogonal to each other. For example the propagation modes may be transverse-electric (TE) and transverse-magnetic (TM) modes. The secondary waveguide 120 may be configured to couple more efficiently to the TE mode or to the TM mode of the signal 150. In an illustrative embodiment the secondary waveguide 120 is configured to couple more efficiently to the TM mode. Thus, for example, both TE and TM light of the signal 150 may initially propagate within the primary waveguide 110. The TM mode may then couple to the secondary waveguide 120 thereby transferring the energy associated with the TM mode to the secondary waveguide 120. The transferred energy is optionally directed away from the primary waveguide 110 and is dissipated to the medium surrounding the secondary waveguide 120. The secondary waveguide 120 and the portion of the primary waveguide 110 coupled thereto thereby function as a propagation mode filter to remove energy associated with the TM mode of the signal 150 from the primary waveguide 110. Embodiments illustrating the utility of this function are described below.

In a nonlimiting example, the primary waveguide 110 is formed from silicon and is configured to propagate a 1.55 µm optical signal (C band). The primary waveguide 110 may have a width $W_1$ of about 430 nm and thickness of about 220 nm. The secondary waveguide 120 has a width $W_2$ that may be about equal to $W_1$, e.g. also about 430 nm, and a thickness of about 220 nm. The coupled portion 130 runs about parallel to the primary waveguide 110 over a distance L of at least about 2.4 µm with a spacing D about equal to 450 nm. In this example the intensity of the TM mode in the primary waveguide 110 may be reduced by at least about 10 dB. In some embodiments, not shown, multiple secondary waveguides, e.g. waveguide fragments, may be located next to the primary waveguide 110 in a sequential manner to increase the attenuation of the TM mode therein. For example, N instances of the secondary waveguide 120 may attenuate the TM mode by about N*10 dB.

As mentioned previously, the redirecting portion 140 is optional. It is expected, however, that the benefit of the filter 100 will be greater when the energy coupled to the secondary waveguide 120 is redirected away from the primary waveguide 110. Furthermore, it is expected that performance of the filter 100 will be further enhanced when the end of the secondary waveguide 120 is far enough from the primary waveguide 110 that light scattered from the end does not significantly couple back into the primary waveguide 110. This distance is expected to depend on factors such as wavelength and intensity of the signal 150, but under some conditions 2-3 µm is expected to be sufficient.

When the redirecting portion 140 is present, it is advantageous that this portion provides a smoothly varying direction with a radius of curvature large enough to guide the light within the secondary waveguide 120. In some embodiments, a bend radius R of at least about 10 µm is sufficient to minimize scattering and effectively guide light therethrough. However, embodiments in which the redirecting portion 140 is other than a smoothly varying path, e.g. a sharp bend, are within the scope of the disclosure. Contemplated embodiments include those in which the one or both of the waveguides 110, 120 includes a bend immediately before or after the coupled portion 130. In the embodiment illustrated in FIG. 1, the bends are about 90°, though the bend or bends are not limited thereto.

Two embodiments are now presented that include one or more instances of coupled waveguides configured to transfer energy of one propagation mode from a primary to a secondary waveguide. While various aspects of these embodiments and benefits provided by such a configuration are described in detail, such descriptions should not be taken to limit the scope of the disclosure to such described uses.

FIG. 2A schematically shows a coherent receiver 200, formed as a photonic integrated circuit (PIC), according to one embodiment of the invention. More specifically, FIG. 2A shows a top view of various components of the receiver 200 in a layout according to one embodiment. The receiver 200 includes two pairs of crossing waveguides. Each pair of waveguides forms a waveguide crossing at the location of intersection. A first unreferenced crossing waveguide pair includes tapered waveguides 205, 210 and a waveguide grating 230. A second unreferenced crossing waveguide pair includes tapered waveguides 255, 260 and a waveguide grating 250. The waveguide gratings are illustrative embodiments of optical input/output couplers that may be used in various embodiments of the disclosure. Herein and in the claims, an input/output coupler is a coupler configured to receive an optical signal from a source external to the PIC 200, or to provide a signal to a destination external to the PIC 200. In various embodiments the waveguide gratings 230, 250 couple to the core of a fiber optic cable (not shown). As discussed further below the waveguide grating 230 may receive a modulated optical signal, e.g. modulated by QPSK to carry digital information. The waveguide grating 250 may receive an unmodulated optical signal, e.g. a local oscillator (LO).

FIG. 2B shows an enlarged top view of the waveguide grating 230, which is also representative of the waveguide grating 250. In a representative embodiment, the waveguide grating 230 comprises a plurality of cavities, pillars, and/or holes 240 etched into or formed on an upper surface of a ridge waveguide to form a two-dimensional, rectangular or square pattern. Each of the four sides of the waveguide grating 230 is connected to a corresponding one of waveguides 205a, 205b, 210a or 210b. The waveguides 205a-b are collinear with each other at the grating 230 and orthogonal to the waveguides 210a-b, which are similarly collinear with each other. A grating that can be used as the waveguide grating 230 is disclosed, e.g., in U.S. Pat. No. 7,065,272, which is incorporated herein by reference in its entirety.

The waveguide grating 230 serves at least three different functions in the receiver 200, e.g., those of (1) an optical fiber coupler, (2) a polarization splitter, and (3) two power splitters, one for each of two different, e.g. orthogonal, polarizations of the optical input signal. More specifically, if the grating 230 is physically abutted with a single-mode optical fiber, e.g., oriented orthogonally with respect to the upper surface of the grating (i.e., perpendicular to the plane of FIGS. 2A-2C), then light from the optical fiber will couple from the optical fiber into waveguides 205a-b and 210a-b, hence the optical fiber coupler functionality of grating 230. If the light in the optical fiber has two polarization components, e.g., an X-polarization component and a Y-polarization component, then the X-polarization component will couple into waveguides 210a-b and the Y-polarization component will couple into waveguides 205a-b, hence the polarization-splitter functionality of grating 230. The coupled optical power of the X polarization will be divided substantially evenly between waveguides 210a-b, hence the power-splitter functionality of grating 230 for the X polarization. Similarly, the coupled optical power of the Y polarization will be divided substantially evenly between waveguides 205a-b, hence the power-splitter functionality of grating 230 for the Y polarization. Additional aspects of the operation of the grating are disclosed, e.g. in PCT Application No. WO 2010/107439 A1, which is incorporated herein by reference in its entirety.

Note that if the optical input signal has a single carrier wavelength, then all three of the above-described functions apply to the signal component having that carrier wavelength. If the optical input signal has multiple carrier wavelengths, then each of the signal components corresponding to different carrier wavelengths is subjected to each of the three above-described functions. The fiber-optic coupling efficiency of the grating 230 can be optimized for any selected wavelength or a range or wavelengths by using a corresponding appropriate pattern of cavities or holes 240. For example, the above-cited U.S. Pat. No. 7,065,272 discloses patterns that can be used for efficiently coupling light having wavelengths between about 1500 nm and about 1600 nm. One skilled in the art will appreciate that, to obtain a grating suitable for efficient coupling of other wavelengths, the disclosed patterns can be modified, e.g., by appropriately changing the periodicity of cavities or holes in the grating.

With continuing reference to FIG. 2B, in an embodiment holes 240p at the perimeter of the waveguide grating 230 are formed differently from holes 240i formed in the interior of the grating 230. For example, in the nonlimiting case that the grating 230 is configured to receive 1.55 μm light, the holes 240 are formed with a lattice spacing of about 580 nm. The holes 240p have a diameter of about 350 nm and a depth of about 55 nm. The holes 240i have a diameter of about 290 nm and a depth of about 120 nm. It is believed that this configuration of the holes 240 provides apodization of the exponential field profile of the grating 230 and reduces the grating back-reflection.

FIG. 2C illustrates the pair of waveguides 205, 210 in isolation, including the waveguide grating 230. The waveguides 205, 210 and the waveguide grating 230 are referred to herein as receiving section 235. A first portion of the X polarization of the received optical signal is directed to a port 245a of the receiving section 235, and a second portion of the X polarization is directed to a port 245b. Similarly, a first portion of the Y polarization of the received optical signal is directed to a port 245c, and a second portion of the Y polarization is directed to a port 245d. In various embodiments the first and second portions of the X polarization are about equal in power, and the first and second portions of the Y polarization are about equal in power. However, the power of the X polarization may be different from the power of the Y polarization.

In a representative embodiment of the receiver 200, the X polarization from an abutted optical fiber efficiently couples into and propagates along each of waveguides 210a-b as a corresponding transverse electric (TE) waveguide mode. The X polarization couples into waveguides 205a-b relatively inefficiently, and this coupling is negligible for all practical purposes. Similarly, the Y polarization from the abutted optical fiber couples efficiently into each of waveguides 205a-b as a corresponding TE waveguide mode and negligibly into waveguides 210a-b.

Typically the energy coupled into a TM waveguide mode of the waveguides 205a-b and 210a-b is also negligible. However, the inventors have found that in some demanding applications, such as for the receiver 200, energy propagating by the TM mode, sometimes referred to herein as TM noise, may be great enough to adversely limit the performance of the receiver 200. TM noise may be generated, e.g. by non-coherent scattering processes within the grating 230 and/or the waveguides 205a-b and 210a-b.

The inventors have further determined that the adverse effects of the TM noise may be substantially reduced by placing an instance of a waveguide fragment 220 near each of the ports 245a-d, where each of the waveguide fragments 220 is configured as described in FIG. 1 to remove TM energy from the signals propagating within the waveguides 205a-b and 210a-b. In some embodiments multiple auxiliary waveguides are placed in series along the same waveguide to increase the amount of TM energy removed.

Returning to FIG. 2A, the second (unreferenced) receiving section is configured nominally identically to the first receiving section 235. The second receiving section includes ports 265a-d. Corresponding ports of the first and second receiving sections are coupled to inputs of respective 2×2 optical couplers, e.g. multimode interference (MMI) couplers, 270a-d. Outputs of the couplers 270a-d are coupled to photodetectors (e.g. PIN photodiodes) 275a-h, where signals provided by the coupler outputs are converted to the electrical domain for further processing. In an embodiment the photodetectors 275a-h are Ge-on-Si vertical PIN photodiodes with Ge regions having sides of about 0.8 μm×8 μm×40 μm for low capacitance and thus high speed.

The waveguide grating 250 may receive an LO selected to demodulate a PDM QPSK signal received by the waveguide grating 230. The waveguide grating 250 may couple equal portions of an X polarization of the LO to waveguides 255a-b and equal portions of a Y polarization to waveguides 260a-b. The X-polarized portions are routed to ports 265a-b, and the Y-polarized portions are routed to ports 265c-d. The path lengths are nominally equal from each grating coupler of the waveguide gratings 230, 250 to each associated coupler 270. Thermo-optic phase shifters 280a-b provide a controllable phase shift to adjust the optical path lengths of the waveguides 205a, 210a to provide a π/2 phase shift to the X and Y polarizations of the received signal propagating in the waveguides 205a, 210a.

In some embodiments each of the diode pairs, e.g. 275a-b, is connected in series to determine an intensity difference between the light received by the diodes. However this approach may about double the capacitance seen at electrical output of the photodiode pair as compared to a single photodiode, potentially reducing the maximum operating speed of the receiver. Moreover, the subtracted photodiode output is typically conditioned by a transimpedance amplifier (TIA) before further processing, and it is typically more difficult to make a linear single-ended TIA than it is to make a linear differential TIA.

Accordingly, in some embodiments differential TIAs are used to condition the outputs of the photodiodes 275. Four differential TIAs may each receive the outputs from each of a pair of photodiode outputs, e.g. photodetector pairs 275a-b, 275c-d, 275e-f and 275g-h. In such embodiments the electrical signal representing the output of one photodetector of a pair of photodetectors 275 is subtracted from the electrical signal representing the output of the other photodetector of the pair of photodetectors 275 within the TIA. This configuration is expected to result in higher speed and more linear amplification than implementations in which single-ended TIAs are used as described above. In various embodiments the TIA is external to the PIC of the receiver 200. The TIA inputs may be wire bonded to bond pads formed on the receiver 200 for this purpose.

With continued reference to FIG. 2A, for each of the X and Y polarizations of an optical communication signal applied to the grating 230, the receiver 200 achieves QPSK demodulation by mixing an in-phase (I) component and a quadrature (Q) component of each polarization with the LO to produce I and Q data components for each polarization. For example, when the X polarization of the received signal is split, a first half of the received power propagates to the coupler 270b, and a second half propagates to the coupler 270c. The second half is subjected to a π/2 phase shift relative to the first half by the thermo-optic shifter 280b. The first and second halves of the LO X polarization are also directed to the couplers 270b-c. The coupler 270b produces balanced outputs for the I component of the X polarization data channel, and the coupler 270c produces balanced outputs for the Q component of the X polarization channel. Recovery of the I and Q data components of the Y polarization data channel occurs analogously, with the I component output at the coupler 270d and the Q component output at the coupler 270a.

In one embodiment, the waveguides 205, 210, optical couplers 270a-b, and photo-detectors 275a-h are all implemented in a monolithic PIC using integration techniques disclosed, e.g., in U.S. patent application Ser. No. 12/229,983. Other known integration techniques may likewise be used.

It is noted that the use of the waveguide fragment 220 is not limited to use with optical devices that use waveguide gratings to separate polarizations of a polarization-division multiplexed signal. For example, a polarization beam splitter may be used to separate TE and TM propagation modes of an optical signal propagating in a planar waveguide. After separation, the TM component may be rotated to a TE propagation mode. Both signal components now being TE polarized, subsequent optical processing may be simplified. See, e.g., Hiroshi Fukuda, et al., "Polarization Beam Splitter and Rotator for Polarization-Independent Silicon Photonic Circuit", 4th IEEE International Conference on Group IV Photonics (2007), Oct. 15, 2007, INSPEC Accession Number 10089350, incorporated herein by reference in its entirety. A waveguide fragment within the scope of the disclosure may be used to filter TM noise from both signal components after the received TM propagation mode is rotated to TE.

Turning now to FIG. 3, another embodiment of the disclosure is illustrate, a multi-core fiber (MCF) switching network 300. Aspects of the switching network are described in U.S. patent application Ser. No. 13/012,712 (the '712 application), incorporated herein in its entirety.

Input arrays 305a-b of waveguide gratings 310 are each configured to receive optical signals from a plurality of optical cores of an MCF (not shown). In the illustrated embodiment, each array 305 includes seven waveguide gratings 310, so a corresponding MCF may include seven optical fiber cores. As described in the '712 application, the waveguide gratings 310 are configured to couple one polarization, e.g. X-polarized light, from a received optical signal to a TE propagation mode propagating to the right. The waveguide gratings 310 are similarly configured to couple another polarization, e.g. Y-polarized light, from the received optical signal to a TM propagation mode propagating to the left.

FIG. 4 illustrates an embodiment of the waveguide grating 310. In this embodiment the waveguide gratings 310 are a linear array of alternating slots and ridges formed in a transition waveguide 410. The period, width and depth of the slots may be configured depending on the wavelength of the received optical signal. In an example embodiment the slots are about 90 nm deep, about 280 nm wide and have a period of about 560 nm in silicon waveguides that are about 220 nm thick.

Referring back to FIG. 3, the TE-polarized light propagates via waveguides 315 directly to an optical switch network 320. The switch network 320 is coupled to output arrays 325a-b via waveguides 330. In various embodiments the mapping of the waveguides 315 to the waveguides 330 provided by the switch network 320 is arbitrary, meaning that any of the waveguides 315 may be connected to any of the waveguide 330.

The TM-polarized light propagates via waveguides 335 and 340 indirectly to an optical switch network 345. The propagation is indirect by virtue of coupling of TM-mode light between ones of the waveguides 335 and corresponding ones of the waveguides 340. The switch network 345 is coupled to the output arrays 325a-b via the waveguides 340. Again the mapping of the waveguides 335 to the waveguides 340 provided by the switch network 345 may be arbitrary.

In some cases the rightward propagating signals may include TM noise due to imperfections of the coupling between the MCF core and the waveguide grating 310. The TM noise may be removed by waveguide fragments 355. As described previously with respect to FIGS. 1 and 2A, the waveguide fragments 355 may couple the unwanted TM light from the waveguides 315, and scatter the light to the surrounding medium.

FIG. 5A illustrates one instance of a waveguide fragment 355 adjacent one of the waveguides 315. The waveguide fragment 355 is located at a distance $D_1$ from the (primary) waveguide 315. In the illustrated embodiment the waveguide 315 includes two 90° bends, e.g. an S curve. Thus the waveguide fragment 355 is spaced a distance $D_2$ from the waveguide 315. While in various embodiments it may be desirable to limit $D_2$ to as small a value as possible to provide a compact waveguide layout, it is expected that preserving a distance $D_2$ of at least about two times $D_1$, and preferably about three or more times $D_1$ will reduce coupling of light from the waveguide fragment 355 back to the waveguide 315 below an acceptable value.

Similarly the leftward propagating signals may include TE noise. In this case, each of the waveguides 335 couples to a corresponding one of the waveguides 340 thereby indirectly coupling the desired TM light to corresponding waveguide 340. The coupling is determined by similar considerations as described for the embodiment of FIG. 1. Thus, for example, TM light is coupled from the (primary) waveguide 335 to the (secondary) waveguide 340. In this case, the TM light is the desired signal. The unwanted TE light remains in the waveguide 335 and is dissipated to the surrounding medium. The coupled portions of the waveguides 335, 340 therefore operate as polarization mode filters.

FIG. 5B illustrates a detail of the overlap of one of the waveguides 335 with a corresponding one of the waveguides 340. The waveguides 335, 340 overlap with an overlap length L that is sufficient for a substantial portion, e.g. at least about 71%, of the TM light to couple from the waveguide 335 to the waveguide 340. Coupling 71% of the light is equivalent to about a 3 dB coupling loss. Preferably the overlap provides no greater than about 2 dB coupling loss (e.g. about 79% coupling), and more preferably the overlap provides no greater than about 1 dB coupling loss (e.g. about 89% coupling).

For example, when the optical carrier propagated by the waveguides 335, 340 has a wavelength of about 1.55 μm, the waveguides 335, 340 formed from silicon may have a width $W_1$ of about 0.43 μm, the waveguide being laterally separated by a space D of about 0.45 μm. An overlap length L of about 2.4 μm and a bend radius of 10 um is expected to couple the TM light with about a 0.5 dB coupling loss. Those skilled in the pertinent art are able to determine proper waveguide width and spacing for other carrier wavelengths.

Returning to FIG. 3, the TE optical signals propagating within the waveguides 315 may be switched by the switching network 320 as described in the '712 application to the various waveguide gratings 310 of the output arrays 325a-b. The TM optical signals propagating within the waveguides 340 may be switched to the various waveguide gratings 310 of the output arrays 325a-b. TE and TM optical signals separated at the input arrays 305 need not be switched to the same waveguide grating 310 at the output arrays 325. By virtue of the reduction of TE and TM noise within the waveguides 315/340 the fidelity of the TE and TM signals recombined at the output arrays 325a-b is expected to be significantly greater than would otherwise be the case.

Turning to FIG. 6, a method 600 of the disclosure is described in one embodiment. The method 600 may be used to form an optical device, e.g., the optical devices 200 and 300, including features described in FIGS. 1-5. The method 600 will be described without limitation by making reference to the various embodiments described herein, e.g. by FIGS. 1-5. The steps of the method 600 may be performed in an order other than the illustrated order.

In a step 610 a input/output optical coupler, e.g. one of the waveguide gratings 230 or 310, is formed that is configured to separate a first received optical signal into first and second signal components. In a step 620 a first waveguide, e.g. one of the waveguides 205, 210, 255, 260, or 315, is connected to the input/output optical coupler and configured to propagate the first signal component via a first propagation mode, e.g. TE. In a step 630 a first waveguide fragment, e.g. the secondary waveguide 120 or the waveguide fragment 355, is formed adjacent the first waveguide. The first waveguide fragment is configured to couple light from the first waveguide that propagates by a second propagation mode, e.g. TM, that is different from the first propagation mode, e.g. TE.

In a step 640, the input/output optical coupler is a waveguide grating. A second waveguide is formed, e.g. waveguide 335, that is connected to the waveguide grating. The second waveguide is about parallel to the first waveguide, e.g. the waveguide 315, at the first waveguide grating. The second waveguide is configured to propagate the second signal component via the second propagation mode, e.g. TM.

In a step 650 a third waveguide, e.g. the waveguide 340, is formed adjacent to the second waveguide, e.g. the waveguide 335. The third waveguide is configured to couple the second signal component via the second propagation mode.

In some embodiments the waveguide grating is one of a plurality of waveguide gratings, e.g. waveguide gratings 310, configured to optically couple to a corresponding plurality of optical cores of a multi-core fiber.

In a step 660 the input/output optical coupler is a first waveguide grating. A second waveguide grating, e.g. waveguide grating 250, is formed that is configured to separate a second received optical signal into third and fourth signal components. In a step 670 a third waveguide, e.g. the waveguide 255 or 260, is connected to the second waveguide grating and is configured to propagate the third signal component via the first propagation mode. In a step 680 a second waveguide fragment is formed adjacent the third waveguide. The second waveguide fragment is configured to couple light from the third waveguide that propagates by the second different propagation mode. In a step 690 a 2×2 multi-mode interference coupler, e.g. coupler 270, is connected to the first and third waveguides.

In a step 695, wherein the input/output optical coupler is a waveguide grating, a second waveguide is formed that is connected to the waveguide grating. The second waveguide is about perpendicular to the first waveguide at the waveguide grating. The second waveguide is configured to propagate the second optical signal via the first propagation mode.

In some embodiments the input/output optical coupler is a two-dimensional pattern grating coupler. In some embodiments the first waveguide is a waveguide of a coherent receiver. In some embodiments the first propagation mode is TE and the second propagation mode is TM. In some embodiments the first propagation mode is about orthogonal to the second propagation mode.

Those skilled in the art to which this application relates will appreciate that other and further additions, deletions, substitutions and modifications may be made to the described embodiments.

What is claimed is:

1. An optical device, comprising:
   an input/output optical coupler configured to separate a first received optical signal into first and second signal components;
   a first waveguide connected to said input/output optical coupler and configured to propagate said first signal component via a first propagation mode;
   a first waveguide fragment adjacent said first waveguide, said first waveguide fragment being configured to couple light from said first waveguide that propagates by a different second propagation mode, and wherein neither end of said first waveguide fragment is connected to another optical device that sends or receives optical energy.

2. The optical device of claim 1, further comprising a second waveguide fragment located adjacent said first waveguide and configured to couple light from said first waveguide that propagates by said second propagation mode.

3. The optical device of claim 1, wherein said input/output optical coupler is a first waveguide grating, and further comprising a second waveguide connected to said first waveguide grating, said second waveguide being about perpendicular to said first waveguide at said first waveguide grating and configured to propagate said second optical signal via said first propagation mode.

4. The optical device of claim 3, further comprising:
   a second waveguide grating configured to separate a second received optical signal into third and fourth signal components;
   a third waveguide connected to said second waveguide grating and configured to propagate said third signal component via said first propagation mode;
   a second waveguide fragment located adjacent said third waveguide, said second waveguide fragment being configured to couple light from said third waveguide that propagates by said second propagation mode.

5. The optical device of claim 4, further comprising a 2×2 multi-mode interference coupler connected to said first and third waveguides.

6. The optical device of claim 1, wherein said input/output optical coupler is a waveguide grating, and further comprising a second waveguide connected to said grating coupler, said second waveguide being about parallel to said first waveguide at said waveguide grating and configured to propagate said second signal component via said second propagation mode.

7. The optical device of claim 3, further comprising a third waveguide adjacent to said second waveguide and configured to couple said second signal component via said second propagation mode.

8. The optical device of claim 3, wherein said first waveguide grating is one of a plurality of waveguide gratings configured to optically couple to a corresponding plurality of optical cores of a multi-core fiber.

9. The optical device of claim 1, wherein said first input/output optical coupler is a two-dimensional pattern grating coupler.

10. The optical device of claim 1, wherein said first waveguide is a waveguide of a coherent receiver.

11. The optical device of claim 1, wherein said first propagation mode is transverse-electric and said second propagation mode is transverse-magnetic.

12. The optical device of claim 1, wherein said first propagation mode is about orthogonal to said second propagation mode.

13. A method, comprising:
   forming an input/output optical coupler configured to separate a first received optical signal into first and second signal components;
   forming a first waveguide connected to said input/output optical coupler and configured to propagate said first signal component via a first propagation mode;
   forming a first waveguide fragment adjacent said first waveguide, said first waveguide fragment being configured to couple light from said first waveguide that propagates by a different second propagation mode, and wherein neither end of said first waveguide fragment is connected to another optical device that sends or receives optical energy.

14. The method of claim 13, wherein said input/output optical coupler is a waveguide grating, and further comprising forming a second waveguide connected to said waveguide grating, said second waveguide being about parallel to said first waveguide at said waveguide grating and configured to propagate said second signal component via said second propagation mode.

15. The method of claim 14, further comprising forming a third waveguide adjacent to said second waveguide and configured to couple said second signal component via said second propagation mode.

16. The method of claim 13, wherein said input/output optical coupler is a waveguide grating, and further comprising forming a second waveguide connected to said waveguide grating, said second waveguide being about perpendicular to said first waveguide at said waveguide grating and configured to propagate said second optical signal via said first propagation mode.

17. The method of claim 13, wherein said input/output optical coupler is one of a plurality of waveguide gratings configured to optically couple to a corresponding plurality of optical cores of a multi-core fiber.

18. The method of claim 13, wherein said input/output optical coupler is a first waveguide grating and further comprising:
   forming a second waveguide grating configured to separate a second received optical signal into third and fourth signal components;
   forming a third waveguide connected to said second waveguide grating and configured to propagate said third signal component via said first propagation mode;
   forming a second waveguide fragment adjacent said third waveguide, said second waveguide fragment being configured to couple light from said third waveguide that propagates by said second propagation mode.

19. The method of claim 18, further comprising connecting a 2×2 multi-mode interference coupler to said first and third waveguides.

20. The method of claim 13, wherein said input/output optical coupler is a two-dimensional pattern grating coupler.

21. The method of claim 13, wherein said first waveguide is a waveguide of a coherent receiver.

22. The method of claim 13, wherein said first propagation mode is transverse-electric and said second propagation mode is transverse-magnetic.

23. The method of claim 13, wherein said first propagation mode is about orthogonal to said second propagation mode.

\* \* \* \* \*